United States Patent [19]

Mateika et al.

[11] Patent Number: 5,790,367
[45] Date of Patent: Aug. 4, 1998

[54] MULTILAYER CAPACITOR COMPRISING A DIELECTRIC OF MODIFIED BARIUM STRONTIUM TITANATE

[75] Inventors: Dieter Mateika, Aachen; Petra Huppertz, Roetgen; Knuth Albertsen; Oliver Steigelmann, both of Aachen, all of Germany

[73] Assignee: U.S. Philips Corporation, New York, N.Y.

[21] Appl. No.: 762,891

[22] Filed: Dec. 10, 1996

[30] Foreign Application Priority Data

Dec. 12, 1995 [DE] Germany .................. 195 46 237.8

[51] Int. Cl.$^6$ ........................................ H01G 4/06
[52] U.S. Cl. .......................... 361/321.4; 361/321.5; 501/134; 501/137
[58] Field of Search .................. 361/306.3, 311, 361/312, 313, 314, 318, 319, 320, 321.1, 321.2, 321.3, 321.4, 321.5, 322, 328; 501/137, 134, 138, 139, 152, 10; 427/123, 77; 419/23

[56] References Cited

U.S. PATENT DOCUMENTS

| | | | |
|---|---|---|---|
| 5,117,326 | 5/1992 | Sano et al. | 361/321.4 |
| 5,130,281 | 7/1992 | Sano et al. | 501/138 |
| 5,232,880 | 8/1993 | Wada et al. | 501/137 |
| 5,296,426 | 3/1994 | Burn | 501/139 |
| 5,571,767 | 11/1996 | Wilson et al. | 501/139 |
| 5,646,080 | 7/1997 | Chu et al. | 501/137 |
| 5,672,378 | 9/1997 | Maher et al. | 427/123 |

FOREIGN PATENT DOCUMENTS

| | | |
|---|---|---|
| 0425971B1 | 5/1991 | European Pat. Off. |
| 0605904 | 7/1994 | European Pat. Off. |

*Primary Examiner*—Bot L. Ledynh
*Assistant Examiner*—Anthony Dinkins
*Attorney, Agent, or Firm*—Norman N. Spain

[57] ABSTRACT

A capacitor having a ceramic dielectric and at least two electrodes, the ceramic dielectric being predominantly composed of a dielectric, ceramic composition having a main component of $BaTiO_3$ and/or $[Ba_{1-y}Sr_y]Ti_xO_{31-z}$, wherein $0.95 \leq x \leq 0.995$, $0 \leq y \leq 0.04$, $z=2(1-x)$, and having at least an additive of the group formed by $XMnO_3$, $X_2MoO_6$, $X_2WO_6$, $X_2SiO_5+Mn_2SiO_4$ and $Li_2SiO_3+Mn_2SiO_4$, and at least an additive of the group formed by $Li_2SiO_3$, $SiO_2$ and a mixture of 6 mol % $Li_2O$, 13 mol % BaO, 13 mol % SrO, 13 mol % MgO and 55 mol % $SiO_2$, which is calcined at 800° C., and, if necessary, an additive of the group formed by $XInO_3$, $XGaO_3$ and $XAlO_3$, wherein X is one or more elements of the group formed by Y, Dy and Er, is characterized by a flat $\Delta C/\Delta t$ curve and a stable dielectric behavior on exposure to temperature and voltage influences.

9 Claims, No Drawings

MULTILAYER CAPACITOR COMPRISING A DIELECTRIC OF MODIFIED BARIUM STRONTIUM TITANATE

BACKGROUND OF THE INVENTION

The invention relates to a capacitor, in particular a multilayer capacitor, comprising a ceramic dielectric and at least two electrodes, said dielectric being predominantly composed of a dielectric, ceramic composition whose main component consists of barium titanate or a barium strontium titanate and additives.

The quality of multilayer capacitors is determined by the chemical composition of their dielectrics and of the electrodes as well as by the manufacturing conditions. In the manufacturing process, various reduction and oxidation processes take place. Barium titanate becomes semiconductive in a reducing atmosphere, in which condition it cannot be used as a dielectric. Multilayer capacitors can be manufactured under oxidizing conditions provided that the electrode material is rhodium or platinum. However, rhodium and platinum are very expensive, i.e. their share of the manufacturing cost may be as much as 50%. Nickel, which is much cheaper, is increasingly being used as the electrode material to reduce the manufacturing cost of multilayer capacitors. However, nickel oxidizes easily, so that multilayer capacitors comprising nickel electrodes must be sintered in an inert or slightly reductive atmosphere. In principle, the above-mentioned reduction processes would lead to the formation of trivalent titanium, which leads to an extreme reduction of the service life of the capacitor. In the meantime, the reducibility of barium titanate has been diminished by means of additives, which are acceptors such as $Co_2O_3$, $Cr_2O_3$ or MnO. These additives serve to inhibit the formation of trivalent titanium. However, these additives do not preclude the formation of oxygen vacancies in the crystal lattice during sintering in a reducing atmosphere. This leads to a drastic reduction of the service life of the capacitors. The formation of oxygen vacancies can be undone when, after sintering in a reducing atmosphere, the capacitors are tempered in a slightly oxidizing atmosphere at temperatures ranging between 600° and 1100° C. In this process, the oxygen vacancies in the lattice are filled up again. A disadvantage of said tempering treatment is the clear reduction of the dielectric constant ε and the negative effect on the ΔC/Δt-curve, i.e. the temperature-dependence of the dielectric constants. Multilayer capacitors must customarily meet the standard X7R, i.e. a temperature-dependence of the specific dielectric constants of ±15% of the value at 250° C. in the temperature range from −55° C. to 125° C., and of ± 15% of the value at 20° C. in the temperature range from −25° C. to 85° C.

To reduce the temperature-dependence of the dielectric constant of barium titanate and of doped barium titanate, several additives are at admixed. For example, EP 0425 971 discloses a capacitor comprising a solid-state dielectric, which is predominantly composed of a barium titanate of the formula $(Ba_{k-x}M_x)O_kTiO_2$, wherein M is at least one of the elements calcium and strontium, k is a number in the range from 1.00 to 1.05, and x is a number in the range from 0.01 to 0.05, and which solid-state dielectric further comprises 0.01 to 3.0 wt. % of a first additional constituent including at least dichromium trioxide and aluminum oxide, and 0.2 to 5.0 wt. % of a second additional constituent including at least one component of the group formed by boron trioxide, lithium oxide, silicon dioxide, barium oxide, strontium oxide, calcium oxide, magnesium oxide and zinc oxide.

A further important quality criterion for multilayer capacitors is the service life. All ceramic materials are subject to some degree of degradation in the course of time. For example, in doped ceramic materials, which contain highly mobile oxygen vacancies as a result of their specific doping, these vacancies can migrate under the influence of an electric voltage and temperature. As a result, the insulation resistance and the dielectric constant change in the course of time, thus limiting the service life of the doped ceramic material.

SUMMARY OF THE INVENTION

Therefore, it is an object of the invention to provide a capacitor, in particular a multilayer capacitor, comprising a ceramic dielectric and at least two electrodes, said dielectric being composed predominantly of a dielectric, ceramic composition having a main component of barium titanate or of a barium strontium titanate, and having additives, which capacitor is characterized by a high dielectric constant, a small temperature-dependence of the dielectric constant in a great temperature range as well as a long service life.

In accordance with the invention, this object is achieved by a capacitor comprising a ceramic dielectric and at least two electrodes, said ceramic dielectric being predominantly composed of a dielectric, ceramic composition having a main component of $BaTiO_3$ and/or $[Ba_{1-y}Sr_y]Ti_xO_{3.31}$; wherein $0.95 \leq x \leq 0.995$, $0 \leq y \leq 0.04$, $z=2(1-x)$, and having at least an additive of the group formed by $XMnO_3$, $X_2MoO_6$, $X_2WO_6$, $X_2SiO_5+Mn_2SiO_4$ and $Li_2SiO_3+Mn_2SiO_4$, and at least an additive of the group formed by $Li_2SiO_3$, $SiO_2$ and a mixture of 6 mol % $Li_2O$, 13 mol % BaO, 13 mol % SrO, 13 mol % MgO and 55 mol % $SiO_2$, which is calcined at 800° C., and, if necessary, an additive of the group formed by $XInO_3$, $XGaO_3$ and $XAlO_3$, wherein X is one or more elements of the group formed by Y, Dy and Er.

The invention is based on the recognition that specific microstresses are generated in the crystal lattice by means of the additives in accordance with the invention, which microstresses have a favorable effect on the temperature stability and long-term stability of the dielectric parameters.

A capacitor in accordance with the invention is characterized by a flat ΔC/Δt curve and a stable dielectric behavior on exposure to temperature and voltage influences, and by a long service life.

A preferred embodiment comprises at least an additive of the group formed by 0.05 to 3 mol % $XMnO_3$, 0.025 to 3 mol % $X_2MoO_6$, 0.025 to 3 mol % $X_2WO_6$, 0.1 to 2 mol % $X_2SiO_5+Mn_2SiO_4$, 0.1 to 2 mol % $Li_2SiO_3+Mn_2SiO_4$, and at least an additive of the group formed by 0.1 to 3 mol % $Li_2SiO_3$, 0.1 to 3 mol % $SiO_2$, 0.2 to 2.5 wt. % of a mixture of 6 mol % $Li_2O$, 13 mol % BaO, 13 mol % SrO, 13 mol % MgO and 55 mol % $SiO_2$, which is calcined at 800° C., and, if necessary, an additive of the group formed by 0.025 to 10 mol % $XInO_3$, 0.025 to 10 mol % $XGaO_3$, 0.025 to 10 mol % $XAlO_3$.

A particularly preferred embodiment comprises at least an additive of the group formed by 0.03 mol % $XMnO_3$, 0.01 mol % $X_2MoO_6$, 0.02 mol % $X_2WO_6$, and a further additive formed by 1.0 wt. % of a mixture of 6 mol % $Li_2O$, 13 mol % BaO, 13 mol % SrO, 13 mol % MgO and 55 mol % $SiO_2$, which is calcined at 800° C.

In accordance with a further preferred embodiment, the electrodes are made of nickel.

The invention further relates to a ceramic dielectric composition comprising a main component of $BaTiO_3$ and/or $[Ba_{1-y}Sr_y]Ti_xO_{3-z}$, wherein $0.95 \leq x \leq 0.995$, $0 \leq y \leq 0.04$, $z=2(1-x)$, and comprising at least an additive of the group formed by $XMnO_3$, $X_2MoO_6$, $X_2WO_6$, $X_2SiO_5+Mn_2SiO_4$ and $Li_2SiO_3+Mn_2SiO_4$, and at least an additive of the group formed by $Li_2SiO_3$, $SiO_2$ and a mixture of 6 mol % $Li_2O$, 13 mol % BaO, 13 mol % SrO, 13 mol % MgO and 55 mol % $SiO_2$, which is calcined at 800° C., and, if necessary, an additive of the group formed by $XInO_3$, $XGaO_3$ and $XAlO_3$.

DETAILED DESCRIPTION OF THE INVENTION

These and other aspects of the invention will be apparent from and elucidated with reference to the embodiments described hereinafter.

The ceramic multilayer capacitor in accordance with the invention comprises a ceramic dielectric, which is composed of a plurality of oxidic dielectric layers having a thickness of maximally 50 μ, as well as a plurality of inner electrodes which are lying stratified in the dielectric and which extend alternately to two opposing end faces of the dielectric. The end faces of the ceramic dielectric are provided with metallic contact electrodes which serve as external connections which are connected to the corresponding metallic inner electrodes.

The material used for the ceramic dielectric is a dielectric ceramic composition comprising a main component of $BaTiO_3$ and/or $[Ba_{1-y}Sr_y]Ti_xO_{3-z}$, wherein $0.95 \leq x \leq 0.995$, $0 \leq y \leq 0.04$, $z=2(1-x)$, and comprising at least an additive of the group formed by $XMnO_3$, $X_2MoO_6$, $X_2WO_6$, $X_2SiO_5+Mn_2SiO_4$ and $Li_2SiO_3+Mn_2SiO_4$, and at least an additive of the group formed by $Li_2SiO_3$, $SiO_2$ and a mixture of 6 mol % $Li_2O$, 13 mol % BaO, 13 Mol % SrO, 13 mol % MgO and 55 mol % $SiO_2$, which is calcined at 800° C., and, if necessary, an additive of the group formed by $XInO_3$, $XGaO_3$ and $XAlO_3$.

A mixture of 6 mol % $Li_2O$, 13 mol % BaO, 13 mol % SrO, 13 mol % MgO and 55 mol % $SiO_2$, which is calcined at 800° C., is used to prepare an additive which will hereinafter be referred to as GL3. This additive fulfills three essential functions. During sintering, a liquid phase is formed from the oxide mixture. As a result, the sintering temperature of the capacitors is reduced substantially. In the liquid phase, the additives are dissolved and, as a result, uniformly distributed over the surface of the barium grains or the barium strontium titanate grains. This distribution function is very important for forming grains having cores and shells. In addition, said GL3 composition serves as a buffer which binds the constituents of the starting mixture which are not converted during sintering like silicates. Moreover, this additive precludes the leaching of small concentrations of, for example, SrO, since SrO is one of the constituents.

The material which can be used for the electrodes is not subject to particular limitations, so that a metal or a combination of two or more customarily used metals can be utilized. The electrodes may be composed of noble metals, such as platinum, palladium, gold or silver. They may also contain chromium, zirconium, vanadium, zinc, copper, tin, lead, manganese, molybdenum, tungsten, titanium or aluminum. The electrodes are preferably made of a base metal, such as nickel, iron or cobalt.

The multilayer capacitors are built up of green ceramic foils, which are manufactured by means of a foil-casting process. This foil-casting process essentially consists of suspending a finely ground powder of said ceramic dielectric composition in organic or aqueous solutions, while using binders and plasticizers, whereafter the slurry thus formed is poured onto a moving bearing surface. Dependent upon the binder system, a more or less flexible foil remains after evaporation of the solvent, which foil is cut, provided with the pattern of the inner electrodes in a printing operation and laminated (stacked). The individual multilayer capacitors are cut from the laminate. Said multilayer capacitors are first sintered in a slightly reducing atmosphere at temperatures ranging between 1100° and 1400° C., whereafter they are tempered in a slightly oxidizing atmosphere at temperatures ranging between 600° and 1100° C. To form the outer electrodes, a metal paste, which contains, for example, nickel, is provided at the end faces of the capacitors and subjected to the action of heat. The outer electrodes can alternatively be provided by vapor deposition of a gold layer.

The ceramic dielectric in accordance with the invention has a particular microstructure which is composed of two-phase grains. In the ceramic dielectric in accordance with the invention, the individual crystallite grains exhibit a layer structure which consists of a core and an outer shell (core-shell grains). In J. Am. Ceram. Soc., 73[5] 1268–73 (1990), a description is given of a zirconium-modified barium titanate having such a layer structure, and of the influence of said layer structure on the dielectric properties of zirconium-modified barium titanate. The core of the crystallite grains may be made of substantially unchanged, pure barium titanate, of barium titanate and barium strontium titanate $(Ba_{1-y}Sr_y)Ti_xO_{3-z}$, wherein $0.95 \leq x \leq 0.995$, $0 \leq y \leq 0.04z=2$ (1−x), or of pure barium strontium titanate $[Ba_{1-y}Sr_y]Ti_xO_{3-z}$, wherein $0.95 \leq x \leq 0.995$, $0 \leq y \leq 0.04$, $z=2(1-x)$. Barium titanate and barium strontium titanate in accordance with the invention have a tetragonal crystal structure. The shell additionally comprises the additives in accordance with the invention. Said additives react in the shell, thereby forming mixed crystals with the main component, or epitaxial layers. Barium-titanate derivatives having a cubic structure are formed by incorporating guest ions from the additives into the outer shell of the barium titanate or barium strontium titanate. This can take place by the formation of mixed crystals or by voltage-induced phase transitions. The incorporation of guest ions into the outer shell of the barium crystal or barium-strontium crystal leads to the formation of crystal zones having different lattice constants and different coefficients of expansion as compared to the crystal core. At the interface between the crystal core and the mixed-crystal zone, mechanical stresses occur which induce a phase transition from tetragonal to cubical in the adjoining crystal regions. In the crystallite core, such a combination of crystal regions having different crystal structures causes the maximum capacitance in the ΔC/Δt curve to level off at the phase transition from tetragonal to cubical at 120° C.

To characterize the capacitors in accordance with the invention, the following measurements were carried out in known manner: the dielectric constant ε at 25° C. prior to tempering of the samples, and the dielectric constant ε* at 25° C. after tempering of the samples at temperatures ranging between 600° and 1100° C., the loss factor tg δ and the RC network at 125° C. and at t=60 s (behavior in time of the capacitor). The service life is measured in an accelerated life test (ALT) at 350° C. and 900 V. For this purpose, test pellets which contact electrodes are manufactured, heated to 350° C. and subjected to a voltage. The current is measured, and this value is used to calculate the insulation resistance. At the beginning of the test, the insulation-resistance value is high, and it remains substantially constant at a high level. It is not until after a characteristic degradation time that the insulation resistance starts to decrease. The current increases in a short period of time, as compared to the duration of the measuring process up to then, by several orders of magnitude. The "service life" is defined as the period of time in which the test current has increased by one order of magnitude.

Table I shows that capacitors comprising the additives in accordance with the invention have a much longer service life than capacitors comprising prior art additives in accordance with Nos. 1, 2 and 3.

Exemplary embodiment

To manufacture a multilayer capacitor comprising a ceramic dielectric including the main component $[Ba_{1-y}Sr_y]Ti_{x.989}O_{3-z}$ and the additives 0.6 mol % $XMnO_3$, 0.5 wt. % GL3 as well as 0.6 mol % $XInO_3$, a quantity of 2501.2 g $BaTiO_3$, 8 g $TiO_2$, 43.4 g $SrCO_3$, 16.6 g $XInO_3$ and 12.5 g GL3 are ground and mixed in a planet ball mill for two hours. For the grinding liquid use is made of cyclohexane. GL3 is composed of a mixture of 6 mol % $Li_2O$, 13 mol % BaO, 13 mol % SrO, 13 mol % MgO and 55 mol % $SiO_2$. Before it is added to the main component, said GL3 mixture is pre-calcined in air at 800° C. for 1 hour.

After grinding in the planet ball mill, the resultant mixture is dried under a surface evaporator in air and subsequently calcined at 750° C. A quantity of 11.6 g $XMnO_3$ is added to the calcined powder, whereafter a grinding or mixing process in said planet ball mill is carried out for one hour. After drying under the surface evaporator, the dielectric ceramic composition can be subjected to further processes.

The powdered material is mixed with polyvinylalcohol, which is used as the binder, and with a surface-active agent, a dispersing agent and water to form a slurry. Said slurry is processed in a doctor coater to form green ceramic foils having a thickness of 20 μm.

Said green foil is cut into foil cards, on which the pattern of the inner electrodes is printed by means of a nickel paste, whereafter said cards are stacked and compressed and divided into individual capacitors. Said capacitors are sintered at temperatures ranging between 1200° and 1400° C. During the sinter process, a gas mixture comprising 99.7% $N_2$ and 0.3% $H_2$ is passed through the furnace. The oxygen partial pressure is adjusted by means of the hydrogen content of the furnace atmosphere. After sintering, the capacitors are tempered in a tempering furnace at temperatures ranging between 650° C. and 1100° C. During said tempering process, a gas mixture comprising nitrogen and 50–100 ppm oxygen is passed through the furnace.

TABLE 1

Dielectric compositions with two or three additives

| No. | Basic Composition | Additive I Mol % | Additive II Gew. % | Additive III Mol % | Sinter-temp. [°C.] | $\epsilon_{25}$ °C. | $\epsilon*_{25}$ °C. | tg θ [%] | RC/s at 125° C. | Service life in hr |
|---|---|---|---|---|---|---|---|---|---|---|
| 1 | $[Ba_{.973}Sr_{.027}](Ti_{.989})O_{3-z}$ | 0.18 MnO | 0,5 GL3 | | 1300 | 3476 | 3486 | 0.5 | 100 | <0.1 h |
| 2 | $[Ba_{.973}Sr_{.027}](Ti_{.989})O_{3-z}$ | 0.36 MnO | 0,5 GL3 | | 1325 | 3159 | 2947 | 0.4 | 150 | 0.8 h |
| 3 | $[Ba_{.973}Sr_{.027}](Ti_{.989})O_{3-z}$ | 0.54 MnO | 0,5 GL3 | | 1300 | 3031 | — | 0.4 | 100 | 1 h |
| 4 | $[Ba_{.973}Sr_{.027}](Ti_{.989})O_{3-z}$ | 0.6 $YMnO_3$ | 0,5 GL3 | | 1325 | 3561 | 2748 | 0.4 | — | 13 h |
| 5 | $[Ba_{.973}Sr_{.027}](Ti_{.989})O_{3-z}$ | 1.0 $YMnO_3$ | 0,5 GL3 | | 1350 | 3327 | 2725 | 0.5 | 120 | ~100 h |
| 6 | $[Ba_{.973}Sr_{.027}](Ti_{.989})O_{3-z}$ | 1.2 $YMnO_3$ | 0,5 GL3 | | 1350 | 2885 | 2517 | 0.6 | — | >100 h |
| 7 | $[Ba_{.973}Sr_{.027}](Ti_{.989})O_{3-z}$ | 1.8 $YMnO_3$ | 0,5 GL3 | | 1350 | 2326 | 2330 | 0.5 | — | >100 h |
| 8 | $[Ba_{.973}Sr_{.027}](Ti_{.989})O_{3-z}$ | 1.0 $YMnO_3$ | 0.3 $SiO_2$ 0.2 $Li_2SiO_3$ | | 1300 | 3097 | 2521 | 0.4 | 50 | >100 h |
| 9 | $[Ba_{.973}Sr_{.027}](Ti_{.989})O_{3-z}$ | 0.5 $Y_2SiO_5$ 0.5 $Mn_2SiO_4$ | 0.2 $Li_2SiO_3$ | | 1325 | 3269 | 2759 | 0.4 | 50 | >200 h |
| 10 | $[Ba_{.973}Sr_{.027}](Ti_{.989})O_{3-z}$ | 0.65 $LiMn_2O_{4-z}$ | 0.3 $SiO_2$ | | 1300 | 2798 | 2597 | 0.6 | 70 | >200 h |
| 11 | $[Ba_{.973}Sr_{.027}](Ti_{.989})O_{3-z}$ | 0.65 $Li_2SiO_3$ 0.3 $Mn_2SiO_4$ | 0.3 $SiO_2$ | | 1275 | 1275 | 2865 | 0.7 | 90 | >100 h |
| 12 | $[Ba_{.973}Sr_{.027}](Ti_{.989})O_{3-z}$ | 0.6 $YMnO_3$ | 0.5 GL3 | 0.6 $YInO_3$ | 1350 | 3502 | 2962 | 0.6 | 70 | 100 |
| 13 | $[Ba_{.973}Sr_{.027}](Ti_{.989})O_{3-z}$ | 0.6 $YMnO_3$ | 0.5 GL3 | 0.1 $YInO_3$ | 1375 | 3416 | 3078 | 0.6 | 150 | 100 |
| 14 | $[Ba_{.973}Sr_{.027}](Ti_{.989})O_{3-z}$ | 0.3 $YMnO_3$ | 0.5 GL3 | 1.2 $YInO_3$ | 1350 | 3871 | 3480 | 0.7 | 500 | 15 |
| 15 | $[Ba_{.973}Sr_{.027}](Ti_{.989})O_{3-z}$ | 0.6 $YMnO_3$ | 0.25 Gew % $Li_2SiO_3$ 0.25 Gew % $SiO_2$ | 0.6 $YInO_3$ | 1275 | 3207 | 2413 | 0.4 | 50 | >120 |
| 16 | $[Ba_{.973}Sr_{.027}](Ti_{.989})O_{3-z}$ | 0.9 $YMnO_3$ | 0.25 Gew % $Li_2SiO_3$ 0.25 Gew % $SiO_2$ | 0.6 $YInO_3$ | 1250 | 2685 | 2400 | 0.4 | 20 | >120 |
| 17 | $[Ba_{.973}Sr_{.027}](Ti_{.989})O_{3-z}$ | 0.6 $YMnO_3$ | 0.5 GL3 | 0.6 $YGaO_3$ | 1375 | 3393 | 3279 | 0.6 | 25 | 75 |
| 18 | $[Ba_{.973}Sr_{.027}](Ti_{.989})O_{3-z}$ | 0.6 $YMnO_3$ | 0.25 Gew % $Li_2SiO_3$ 0.25 Gew % $SiO_2$ | 1.2 $YGaO_3$ | 1250 | 2871 | 2556 | 0.5 | 45 | >120 |
| 19 | $[Ba_{.973}Sr_{.027}](Ti_{.989})O_{3-z}$ | 0.9 $YMnO_3$ | 0.25 Gew % $Li_2SiO_3$ 0.25 Gew % $SiO_2$ | 0.6 $YGaO_3$ | 1250 | 2537 | 2227 | 0.4 | 20 | >120 |
| 20 | $[Ba_{.973}Sr_{.027}](Ti_{.989})O_{3-z}$ | 0.6 $YMnO_3$ | 0.5 GL3 | 0.6 $YAlO_3$ | 1375 | 3014 | 2937 | 0.5 | 25 | 60 |
| 21 | $[Ba_{.973}Sr_{.027}](Ti_{.989})O_{3-z}$ | 0.6 $YMnO_3$ 0.4 $Y_2MnO_6$ | 0.5 GL3 | — | 1325 | 3472 | 3200 | 0.5 | 30 | >140 |
| 22 | $[Ba_{.973}Sr_{.027}](Ti_{.989})O_{3-z}$ | 0.6 $YMnO_3$ 0.4 $Y_2MoO_6$ | 0.5 GL3 | — | 1325 | 3418 | 3079 | 0.5 | 35 | >130 |
| 23 | $[Ba_{.973}Sr_{.027}](Ti_{.989})O_{3-z}$ | 0.3 $YMnO_3$ 0.3 $Y_2MoO_6$ | 0.5 GL3 | 1.2 $YInO_3$ | 1275 | 3286 | 3424 | 0.8 | 210 | >130 |
| 24 | $[Ba_{.973}Sr_{.027}](Ti_{.989})O_{3-z}$ | 0.6 $YMnO_3$ 0.4 $Y_2MoO_6$ | 0.5 GL3 | 0.3 $YAlO_3$ | 1375 | 2803 | 2834 | 0.4 | 30 | >120 |
| 25 | $[Ba_{.973}Sr_{.027}](Ti_{.989})O_{3-z}$ | 0.3 $YMnO_3$ 0.3 $Y_2MoO_6$ | 0.5 GL3 | 0.9 $YInO_3$ 0.3 $YAlO_3$ | 1275 | 2576 | 2736 | 0.5 | 120 | >130 |
| 26 | $[Ba_{.973}Sr_{.027}](Ti_{.989})O_{3-z}$ | 0.6 $YMnO_3$ 0.2 $Y_2WO_6$ | 0.5 GL3 | — | 1300 | 3414 | 2950 | 0.5 | 50 | >120 |
| 27 | $[Ba_{.973}Sr_{.027}](Ti_{.989})O_{3-z}$ | 0.65 $LiMn_2O_{4-z}$ 0.4 $Y_2MoO_6$ | 0.2 $SiO_2$ | — | 1325 | 2906 | 2660 | 0.8 | 2 | 30 |
| 28 | $[Ba_{.973}Sr_{.027}](Ti_{.989})O_{3-z}$ | 0.6 $YMnO_3$ 0.4 $Y_2MoO_6$ | 0.4 GL3 0.2 $Li_2SiO_3$ | — | 1275 | 3206 | 2834 | 0.5 | 30 | >130 |

We claim:

1. A capacitor comprising a ceramic dielectric and at least two electrodes, said ceramic dielectric consisting essentially of a dielectric, ceramic composition having a main component of $BaTiO_3$ and/or $[Ba_{1-y}Sr_y]Ti_{3-z}$, wherein $0.95 \leq x \leq 0.995$, $0 \leq y \leq 0.04$, $z=2(1-x)$, an additive of the group formed by $XMnO_3$, $X_2MoO_6$, $X_2WO_6$, $X_2SiO_5 + Mn_2SiO_4$ and $Li_2SiO_3 + Mn_2SiO_4$, and at an additive of the group formed by $Li_2SiO_3$, $SiO_2$ and a mixture of 6 mol % $Li_2O$, 13 mol % BaO, 13 mol % SrO, 13 mol % MgO and 55 mol % $SiO_2$, which is calcined at 800° C., wherein X is one or more elements of the group formed by Y, Dy and Er.

2. A capacitor as claimed in claim 1, wherein the dielectric comprises an additive of the group formed by 0.05 to 3 mol % $XMnO_3$, 0.025 to 3 mol % $X_2MoO_6$, 0.025 to 3 mol % $X_2WO_6$, 0.1 to 2 mol % $X_2SiO_5 + Mn_2SiO_4$, 0.1 to 2 mol % $Li_2SiO_3 + Mn_2SiO_4$, and at least an additive of the group formed by 0.1 to 3 mol % $Li_2SiO_3$, 0.1 to 3 mol % $SiO_2$, 0.2 to 2.5 wt. % of a mixture of 6 mol % $Li_2O$, 13 mol % BaO, 13 mol % SrO, 13 mol % MgO and 55 mol % $SiO_2$, which is calcined at 800° C.

3. A capacitor as claimed in claim 1 comprising an additive selected from the group consisting of 0.03 mol % $XMnO_3$, 0.01 mol % $X_2MoO_6$ and 0.002 mol % $X_2WO_6$, and a further additive formed by 1.0 wt. % of a mixture of 6 mol % $Li_2O$, 13 mol % BaO, 13 mol % SrO, 13 mol % MgO and 55 mol % $SiO_2$, which is calcined at 800° C.

4. A capacitor as claimed in claim 1, in which the said at least two electrodes are made of nickel.

5. A ceramic dielectric composition comprising a main component of $BaTiO_3$ and/or $[Ba_{1-y}Sr_y]Ti_xO_{3-z}$, wherein $0.95 \leq x \leq 0.995$, $0 \leq y \leq 0.04$, $z=2(1-x)$, an additive selected from the group consisting of $XMnO_3$, $X_2MoO_6$, $X_2WO_6$, $X_2SiO_5 + Mn_2SiO_4$, and $Li_2SiO3 + Mn2SiO_4$, wherein X is Y, Dy or Er and an additive selected from the group consisting of $Li_2SiO_3$, $SiO_2$ and a mixture of 6 mol % $Li_2O$, 13 mol % BaO, 13 mol % SrO, 13 mol % MgO and 55 mol % $SiO_2$, which is calcined at 800° C.

6. A capacitor comprising a ceramic dielectric and at least two electrodes, said ceramic dielectric consisting essentially of a dielectric ceramic composition having a main component of $BaTiO_3$ and/or $[Ba_{1-y}Sr_y]Ti_xO_{3-z}$, wherein $0.95 \leq x \leq 0.995$, $0 \leq y \leq 0.04$, $z=2(1-x)$, at least one additive selected from the group consisting of $XnNO_3$, $X_2MoO_6$, $X_2WO_6$, a mixture of $X_2SiO_5$ and $Mn_2SiO_4$ and a mixture of $Li_2SiO_3$ and $Mn_2SiO_4$, at least one additive selected from the group consisting of $Li_2SiO_3$, $SiO_2$ and a mixture of 6 mol.% $Li_2O$, 13 mol.% BaO, 13 mol% MgO and 55 mol.% $SiO_2$, calcined at 800° C., and an additive selected from the group consisting of $XInO_3$, $XGaO_3$ and $XAlO_3$, wherein X is at least one element selected from the group consisting of Y, Dy and Er.

7. A capacitor as claimed in claim 6, comprising an additive selected from the group consisting of 0.05 to 3 mol % $XMnO_3$, 0.025 to 3 % mol % $X_2WO_6$, 0.1 to 2 mol % $X_2SiO_5 + Mn_2SiO_4$, 0.1 to 2 % mol % $Li_2SiO_3 + Mn_2SiO_4$, an additive selected from the group consisting of 0.1 to 3 mol % $Li_2SiO_3$, 0.1 to 3 mol % $SiO_2$ and 0.2 to 2.5 wt. % of a mixture of 6 mol % $Li_2O$, 13 mol % BaO, 13 mol % SrO, 13 mol % MgO and 55 mol % $SiO_2$, which is calcined at 800° C. and an additive of the group consisting of 0.025 to 10 mol % XInO, 0.025 to 10 mol % $XGaO_3$, and 0.025 to 10 mol % $XAlO_3$.

8. A capacitor as claimed in claim 6 in which the said at least two electrodes are made of nickel.

9. A ceramic dielectric consisting essentially of a dielectric ceramic composition having a main component of $BaTiO_3$ and/or $[Ba_{1-y}Sr_y]Ti_xO_{3-z}$, wherein $0.95 \leq x \leq 0.995$, $0 \leq y \leq 0.04$, $z=2(1-x)$, at least one additive selected from the group consisting of $XMnO_3$, $X_2MoO_6$, $X_2WO_6$, a mixture of $X_2SiO_5$ and $Mn_2SiO_4$ and a mixture of $Li_2SiO_3$ and $Mn_2SiO_4$, at least one additive selected from the group consisting of $Li_2SiO_3$, $SiO_2$ and a mixture of 6 mol.% $Li_2O$, 13 mol.% BaO, 13 mol% MgO and 55 mol.% $SiO_2$, calcined at 800° C., and an additive selected from the group consisting of $XInO_3$, $XGaO_3$ and $XAlO_3$, wherein X is at least one element selected from the group consisting of Y, Dy and Er.

* * * * *